(12) United States Patent
Pierce (10) Patent No.: US 7,707,072 B2
(45) Date of Patent: Apr. 27, 2010

(54) METHOD, SYSTEM, AND APPARATUS CONFIGURED TO MANAGE ENTITLEMENTS RELATIVE TO NEW PURCHASES

(75) Inventor: Darryl L. Pierce, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 11/882,954

(22) Filed: Aug. 8, 2007

(65) Prior Publication Data

US 2009/0043596 A1    Feb. 12, 2009

(51) Int. Cl.
*G06Q 30/00* (2006.01)

(52) U.S. Cl. .............................. 705/26; 705/27; 705/51; 705/52; 705/53; 705/54; 705/55; 705/56; 705/58; 705/59

(58) Field of Classification Search ............ 705/1, 705/26–27, 51–59
See application file for complete search history.

(56) References Cited

U.S. PATENT DOCUMENTS 6,167,383 A * 12/2000 Henson ....................... 705/26
2003/0028454 A1 * 2/2003 Ooho et al. ................... 705/32
2006/0089917 A1 * 4/2006 Strom et al. .................. 705/59
2006/0155711 A1 * 7/2006 Jackson et al. .............. 707/100

OTHER PUBLICATIONS

"RioPort Unveils Industry-First Technology for Secure Playback of Subscription Music Downloads on Portable Devices". Business Wire , Thursday , Jan. 3, 2002 [recovered from.*

* cited by examiner

*Primary Examiner*—Jeffrey A. Smith
*Assistant Examiner*—William J. Allen
(74) *Attorney, Agent, or Firm*—MH2 Technology Law Group LLP (57) ABSTRACT

An embodiment relates generally to a method of managing entitlements. The method includes receiving an indication of at least one purchase of a product by a user and determining an entitlement history of the user. The method also includes determining a plurality of purchasing conditions based on the entitlement history state and the at least one purchase of the product and providing the plurality of purchasing conditions for a user to select.

21 Claims, 8 Drawing Sheets

| USER ID | FIRST NAME | LAST NAME | BILLING ADDRESS |
|---|---|---|---|
| | LAST LOG-IN | USER HISTORY | PAYMENT METHOD |

| PRODUCT PURCHASED | ENTITLEMENT | DATE PURCHASED | CURRENT EXPIRATION |
|---|---|---|---|
| PRODUCT PURCHASED | ENTITLEMENT | DATE PURCHASED | CURRENT EXPIRATION |
| ⋮ | ⋮ | ⋮ | ⋮ |
| PRODUCT PURCHASED | ENTITLEMENT | DATE PURCHASED | CURRENT EXPIRATION |

METHOD, SYSTEM, AND APPARATUS CONFIGURED TO MANAGE ENTITLEMENTS RELATIVE TO NEW PURCHASES

FIELD

This invention relates generally to entitlements, more particularly, to systems and methods for consolidated entitlement management.

DESCRIPTION OF THE RELATED ART

The proliferation of the World Wide Web through the Internet has made a wealth of products and services available to users to purchase and use nearly instantaneous. Vendors, service providers, manufacturers, third party distributors, etc., may have web sites for the users to review and purchase their respective products and/or services.

As users visit web sites to purchase respective products and/or services, the products and/or services can often have an associated operating period. For example, a user may purchase a technical support contract for a year to service a purchased product or a software package provides free updates for two years. Accordingly, any type of limited period of time service or license associated with a product and/or service can be regarded as an entitlement.

Users often purchase products or services over a long period of time. As a result, the list of products and/or services that a user must track can accumulate to a large number especially if the user is a system administrator managing an informational technology department of a large corporation. As the number of products and/or services purchases grows over time, the managing of the associated entitlements can become burdensome. Although the vendors can often send electronic reminders or have their sales staff remind the user of renewals, the user may still have to expend a large amount of time to organize and manage the associated entitlements to ensure continuous operation of the respective products and/or services.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate to systems and methods for managing entitlements for a user. More particularly, products (hardware, software, services, etc.) purchased from a service portal can have associated entitlements. An entitlement can be any type of service or license associated with a product that may have an operating period. For example, a software application product may permit a user to an entitlement of one year of free software support plus an option for live chat for three months. Another example can be a user pack associated with a previously purchased product that may have an operating life of one year.

A consolidated entitlement manager can be configured to provide a mechanism for a user to manage the associated entitlements with any product purchased from the service portal. More particularly, the consolidated entitlement manager can provide the purchasing user a mechanism to manage the associated entitlements with past purchases of products as well as current and future purchases of items on the service portal. For example, a selected user may have purchased Product A with a one year support service contract. One month later, the same user can purchase Product B with a two-year support service contract. The entitlement manager can then be configured to provide several buying options for the user. The consolidated entitlement manager can determine the price point options for synchronizing the support services contract, either extending service contract for Application A, pro-rating service contract for Application B or purchase as selected. Accordingly, a purchasing user can be provided with options on how to cost effectively manage the products purchased from the service portal.

Figure 1:
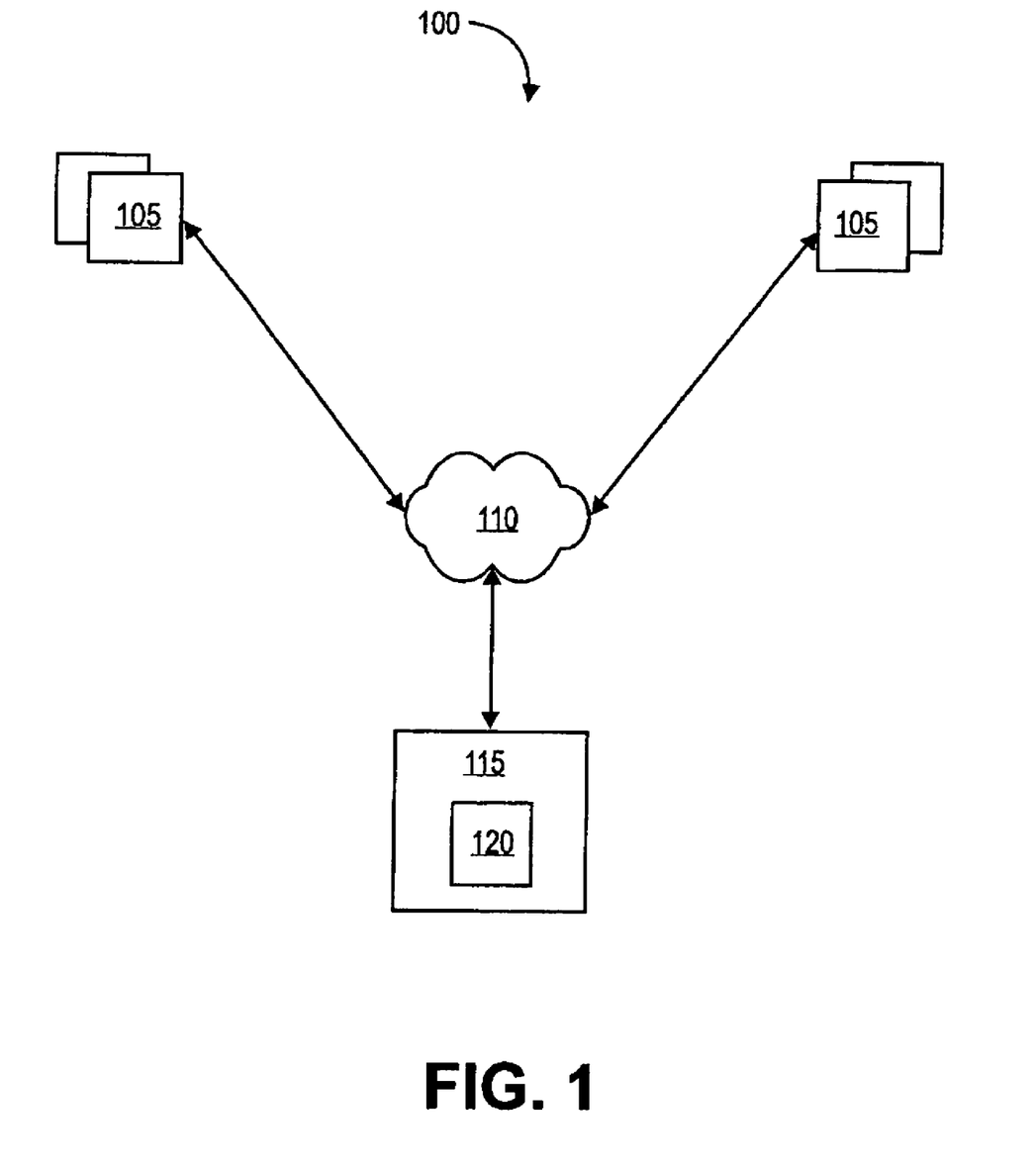
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes users 105, a network 110 and a service portal 115. The users 105 can be private individuals, employees of private business or public entities or other persons interested in accessing the service portal 115. The users 105 can access the service portal 115 using personal computers, personal mobile devices, workstations or other networked computing platforms.

The network 110 can be a combination of wide area and local area networks such as the Internet. The network 110 can be configured to provide a communication channel between the users 105 and the service portal 115. The network 110 can implement a variety of network protocols to provide the communication channel such as Internet Protocol ("IP") Vx, ATM, SONET, or other similar network protocols.

The service portal 115 can be configured to provide products and services to the user 105 as well as provisioning, installation services, updates to software and hardware products and technical support. The service portal 115 can, among other functions, provide a list of products such as software applications or hardware devices as well as services such as installation, configuration, maintenance, etc., for users to purchase. As a non-limiting example, the service portal 115 can also provide information for users to research, compare and purchase software, hardware and consulting services in support of those software and/or hardware purchases. The service portal 115 can also be configured to provide support services by subscription to those same software, service, and/or hardware purchases.

In accordance with various embodiments, the service portal 115 can be configured to provide consolidated entitlement management by an entitlement manager 120. More specifically, the entitlement manager 120 can provide a mechanism for a user to manage the associated entitlements with any product and/or service purchased from the service portal 115 along with any previous purchases. For example, a selected user may have purchased Product A with a one year support service contract. One month later, the same user can purchase Product B with a two-year support service contract. The entitlement manager 120 can then be configured to provide several buying options for the user. The entitlement manager 120 can determine the price point options for synchronizing the support services contract, i.e., either extending service contract for Application A, pro-rating service contract for Application B, or purchase as selected. Accordingly, a purchasing user can be provided with options on how to cost effectively manage the products and/or services purchased from the service portal 115.

Figure 2:
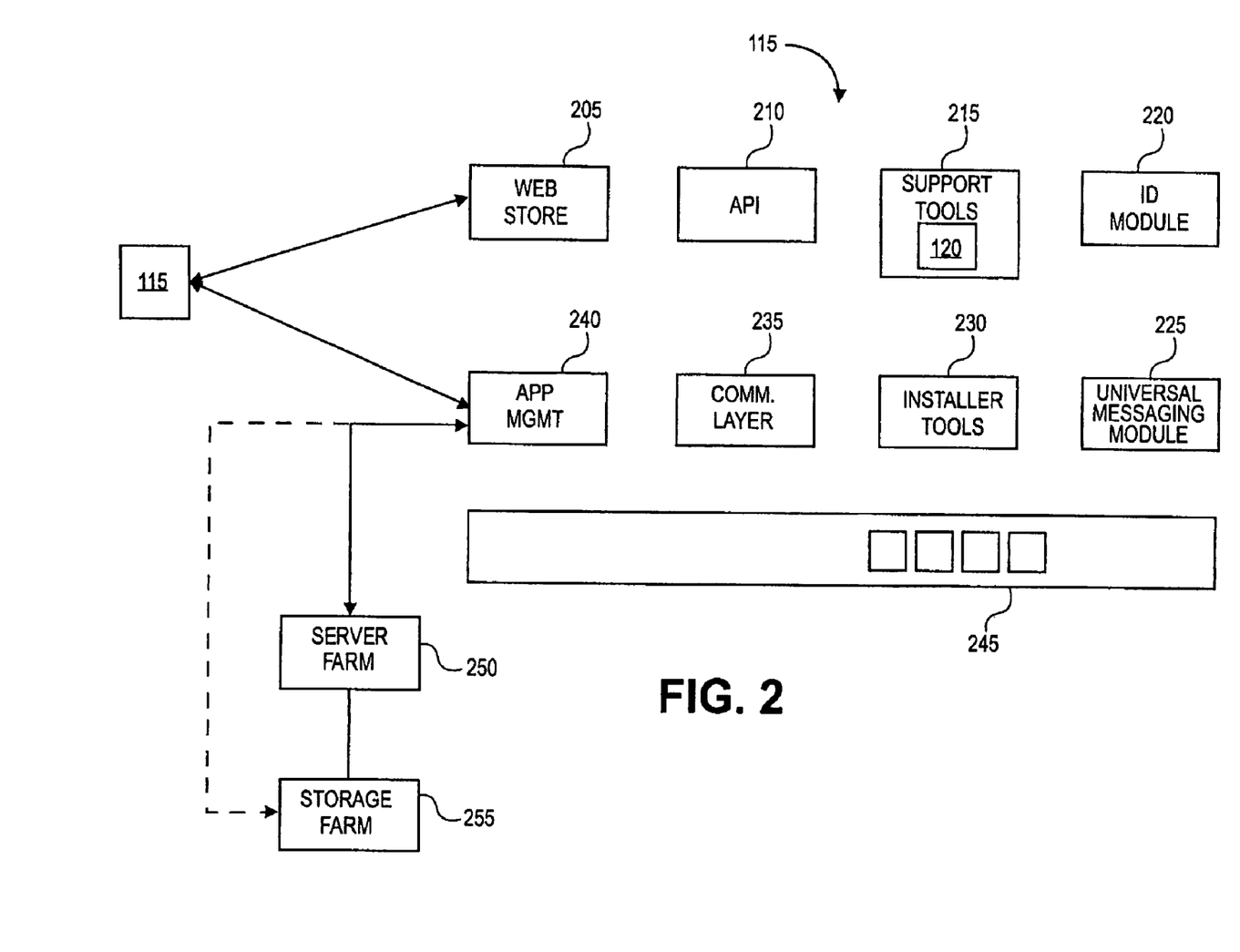
FIG. 2 illustrates an exemplary service portal of the system shown in FIG. 1 in accordance with another embodiment.

FIG. 2 illustrates a more detailed block diagram of the service portal 115 in accordance with another embodiment. It should be readily apparent to those of ordinary skill in the art that the service portal 115 depicted in FIG. 2 represents a generalized schematic illustration and that other components may be added or existing components may be removed or modified.

As shown in FIG. 2, the service portal 115 can include a web store module 205 that a user can interface with the service portal. The web store module 205 can provide the graphical user interfaces ("GUIs") and associated functions and/or services for the service portal 115. As an non-limiting example, the web store module 205 can generate a log-in GUI for a user to authenticate and enter the service portal 115.

The web store module 205 can couple with an application program interface ("API") module 210. The API module 210 can be configured to provide an interface between the functions and/or services provided by the web store module 205 and to the appropriate module of the service portal 115. More particularly, the API module 210 can call or direct a requested function or service from the user to the respective module that provides that requested function or service. For example, a user may request a price of a product, e.g., an electronic mail program, the API module 210 can direct the request to a get price function in a support tools module 215.

The API module 210 can also be configured to interface with the support tools module 215. The support tools module 215 can be configured to provide the supporting software and hardware to implement the functionality of the service portal 115. The support tools module 215 can contain and provide access to databases that contain information such as products lines, services providers, on-line self-help (e.g., knowledge-base), etc. The support tools module 215 can also provide services like a chat services, a help desk, installation, provisioning, etc.

The API module 210 can be further configured to couple with an identification ("ID") module 220. The ID module 220 can be configured to provide identification management services for the service portal 115. The ID module 220 can also store information related to users such as purchase history, user profile, usage history of the user, and entitlement data.

The API module 210 can be further configured to couple with a universal messaging module 225. The universal messaging module 225 can be configured to provide a messaging application that unifies messages. More specifically, electronic mail ("email"), documents, and instant messaging can be linked in a single application. The universal messaging module 225 can also provide a mechanism for a user to view all the related documents for the user from email to Wiki pages.

An installer tools 230 can be coupled to the API module 210. One of the services provided by the service portal 115 can be the purchase of software applications provided by independent software vendors ("ISVs"). As part of the delivery of the software applications, the ISV can be required to maintain and update the installation tools to install their respective software applications. Accordingly, the install tools 230 can be a repository where independent software vendors can deposit their respective installation tools.

The API module 210 can be further coupled to the communication layer 235 (labeled as COMM layer in FIG. 2). The comm layer 235 can be configured to provide the underlying services for the modules of the service portal 115 to communicate. For example, the comm layer 235 can contain middleware for a product database to communicate with a graphical user interface requesting product description.

The API module 210 can be further coupled to an application management module 240 (labeled as APP MGMT in FIG. 2). The application management module 240 can be configured to manage applications as requested by users. More specifically, a user may purchase a prepackaged software application pack (e.g., an operating system, electronic mail program and data mining program) from the service portal 115, the which is stored in the application stack module 245. The application management module 240 can then deliver the purchased software stack, install and configure the software application stack at a third party site such as server farm 250 or store the software application stack in the storage farm 255 for the user to retrieve.

The server farm 250 can be configured to provide computing platforms users to lease. Accordingly, users can have a backup version of their systems, a testing platform to perform quality assurance tests on new applications, execute a program requiring excess MIPS, or any other similar computing task.

The storage farm 255 can be configured to provide storage space for users to lease. Accordingly, users can lease disk storage space to back up data, provide a hot data swap, or other storage intensive tasks.

In some embodiments, the entitlement manager 120 can be configured to be executed in the support tools module 215. In other embodiments, the entitlement manager 120 can be a module of the ID module 220: In yet other embodiments, the entitlement manager 120 can be executed as a standalone module.

Figure 3:
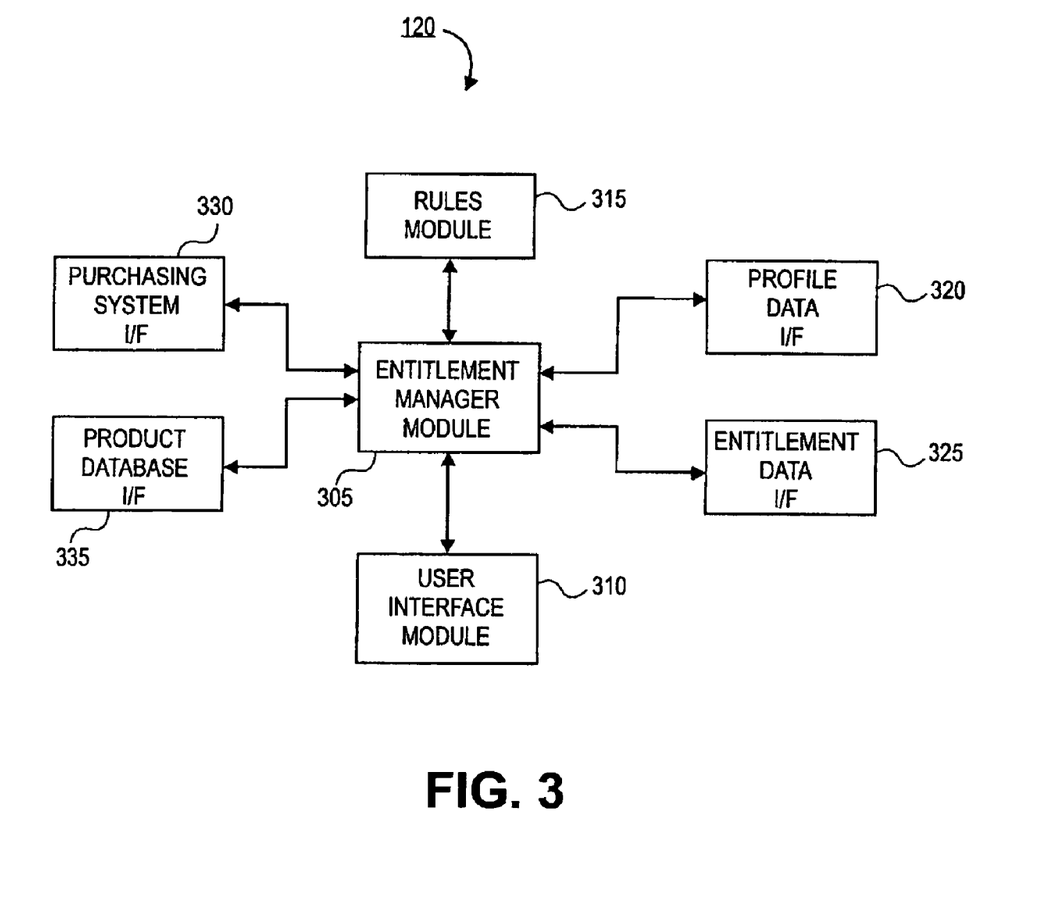
FIG. 3 depicts an exemplary entitlement manager module shown in FIG. 1 in accordance with yet another embodiment.

FIG. 3 depicts a more detailed block diagram of the entitlement manager 120 in accordance with another embodiment. It should be readily apparent to those of ordinary skill in the art that the entitlement manager 120 depicted in FIG. 3 represents a generalized schematic illustration and that other components may be added or existing components may be removed or modified.

As shown in FIG. 3, the entitlement manager 120 can comprise an entitlement manager module 305, the user interface module 310, a rules module 315, a profile data interface 320, an entitlement data interface 325, a purchasing system interface 330 and a product database interface 335. It should be readily obvious to one of ordinary skill in the art that the modules 305-335 can be implemented as software applications (programmed in C, C++, JAVA, PHP, etc.), hardware components (EEPROM, application specific integrated circuit, microprocessor, etc.) or combinations thereof.

The entitlement manager module 305 can be configured to manage and interface with the other modules 310-335 to provide the functionality of the entitlement manager 120 as described above and further described hereinbelow.

The user interface module 310 can be configured to generate graphical user interface ("GUIs") as required by the entitlement manager module 305. For example, the user interface module 310 can generate a product/service browse GUI for a user to view the products and services available for purchase on the service portal 115. As part of the product/service browse GUI, a search widget can be placed on this GUI for a user to focus the search in a timely and efficient manner.

The entitlement manager module 305 can also be coupled to the rules module 315. The rules module 315 can be configured to store the heuristics or algorithms to determine the various purchase conditions based on the purchase history and entitlement data of a user. For example, one rule can be to calculate the cost of extending all previously purchased entitlements with a current selection of product or service. Another example of a rule or heuristic can be to calculate the cost of pro-rating the current selection of product or service with the earliest entitlement. Other rules can be implemented as required by the system administrators of the service portal 115.

The entitlement manager module 305 can also be coupled to the profile data interface 320, which is configured to retrieve the profile data of the purchasing user. The profile data can be stored in the ID module 220 or, in other embodiments, the profile data can be stored in a remote secure location. Regardless, the profile data interface 320 can provide the communication channel to the persistent storage device that stores the profile data.

Figure 4:
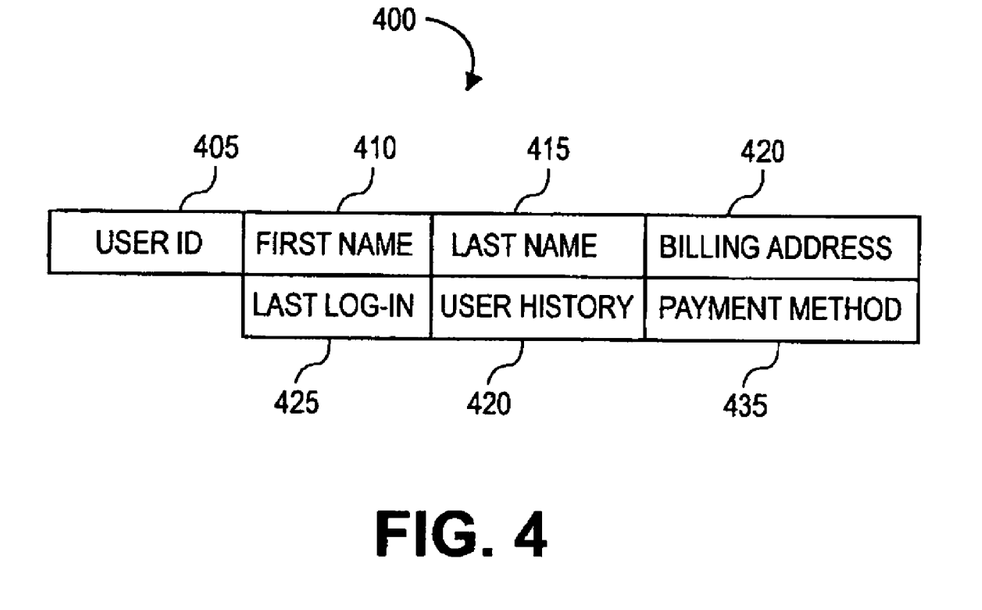
FIG. 4 illustrates an exemplary user profile record in accordance with yet another embodiment.

The profile data can contain information associated with a user, as depicted in FIG. 4. As shown in FIG. 4, the profile data schema 400 can comprise a user identification field 405, a first name field 410, a last name field 415, a billing address 420, a last log-in field 425, a user history field 430, and a payment method field 435. It should be readily obvious to one of ordinary skill in the art that the schema 400 is a schematic representation and that additional fields could be added or the existing fields may be removed or amended without departing from the scope of the claimed invention.

The user identification (labeled as USER ID in FIG. 4) field 405 can store the log-in name of the user to access the service portal 115. The user can obtain a user ID when the user registers in the service portal 115.

The first name field 410 can store the first name of the legal name of the user. Similarly, the last name field 415 can store the surname of the legal name of the user.

The billing address field 420 can store the address where the user would prefer the bills from the service portal 115 to be sent. The last log-in field 425 can be configured to store the previous log-in date and time when the user last visited the service portal 115.

The user history field 430 can be configured to contain information related to the past visits of the user to the user portal. This field 430 can contain the number of visits to a help desk, how often the user uses the knowledgebase, or other activities that the system administrator would like to track. This information can then be used to improve the existing functionality of the service portal 115 or to add additional functions.

The payment method field 435 can store the method of payment for services and/or products that the user purchases. For example, this field 435 can store the corporate credit card or an account number to bill.

Returning to FIG. 3, the entitlement manager module 305 can also be coupled to the entitlement data interface 325, which is configured to retrieve the entitlement data of the purchasing user. The entitlement data can be stored in the entitlement manager 120, the ID module 220 or, in other embodiments, the entitlement data can be stored in a remote secure location. Regardless, the entitlement data interface 325 can be provide the communication channel to the persistent storage device that stores the entitlement data.

Figure 5:
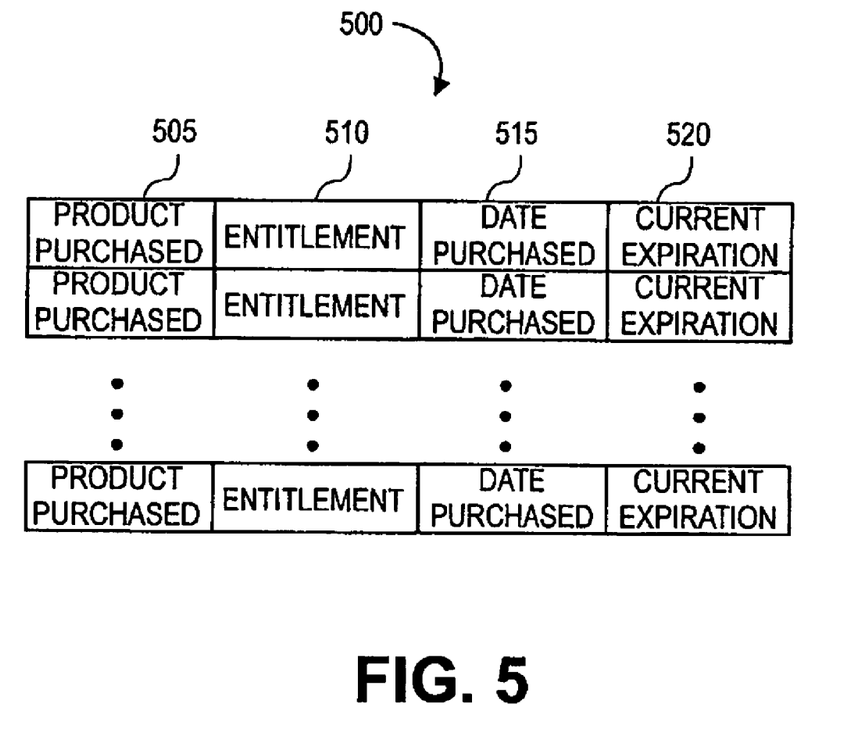
FIG. 5 depicts an exemplary database record in accordance with yet another embodiment.

The entitlement data can contain the entitlement information associated with a user, as depicted in FIG. 5. As shown in FIG. 5, the entitlement data schema 500 can comprise a product purchased field 505, an entitlement field 510, a date purchased field 515, and a current expiration field 520. It should be readily obvious to one of ordinary skill in the art that the schema 500 is a schematic representation and that additional fields could be added or the existing fields may be removed or amended without departing from the scope of the claimed invention.

The product purchased field 505 can be configured to store the name of the product or service purchased by a user. The name can be represented by a SKU number, UPC number, textual description, or some predefined convention. The entitlement field 510 can store the type of entitlement associated with the product. For example, one type of entitlement can be a subscription for one year of technical support. Another type of entitlement can be license to operate a product for a year (e.g., user packs). In other words, entitlements can be items associated with a product that has a limited operating life.

The date purchased field 515 can indicate the date of purchase of the product or service purchased. The current expiration field 520 can be configured to store the date that the associated entitlement is going to expire. For example, a support contract indicated in entitlement field 510 can be set to expire on the date of Jan. 30, 2008, which would be stored in the current expiration field 520.

Returning to FIG. 3, the entitlement manager module 305 can be further coupled to the purchasing system interface 330 and the product database interface 335. The purchasing system interface 330 can be configured for the entitlement manager module 305 to send user selected products and/or services to be purchased. The product database interface 335 can be configured to allow the entitlement manager module 305 to retrieve information about available products and/or services for purchase on the service portal 115. The entitlement manager module 305 can retrieve this information to display for a user to view, browse and select.

Figure 6:
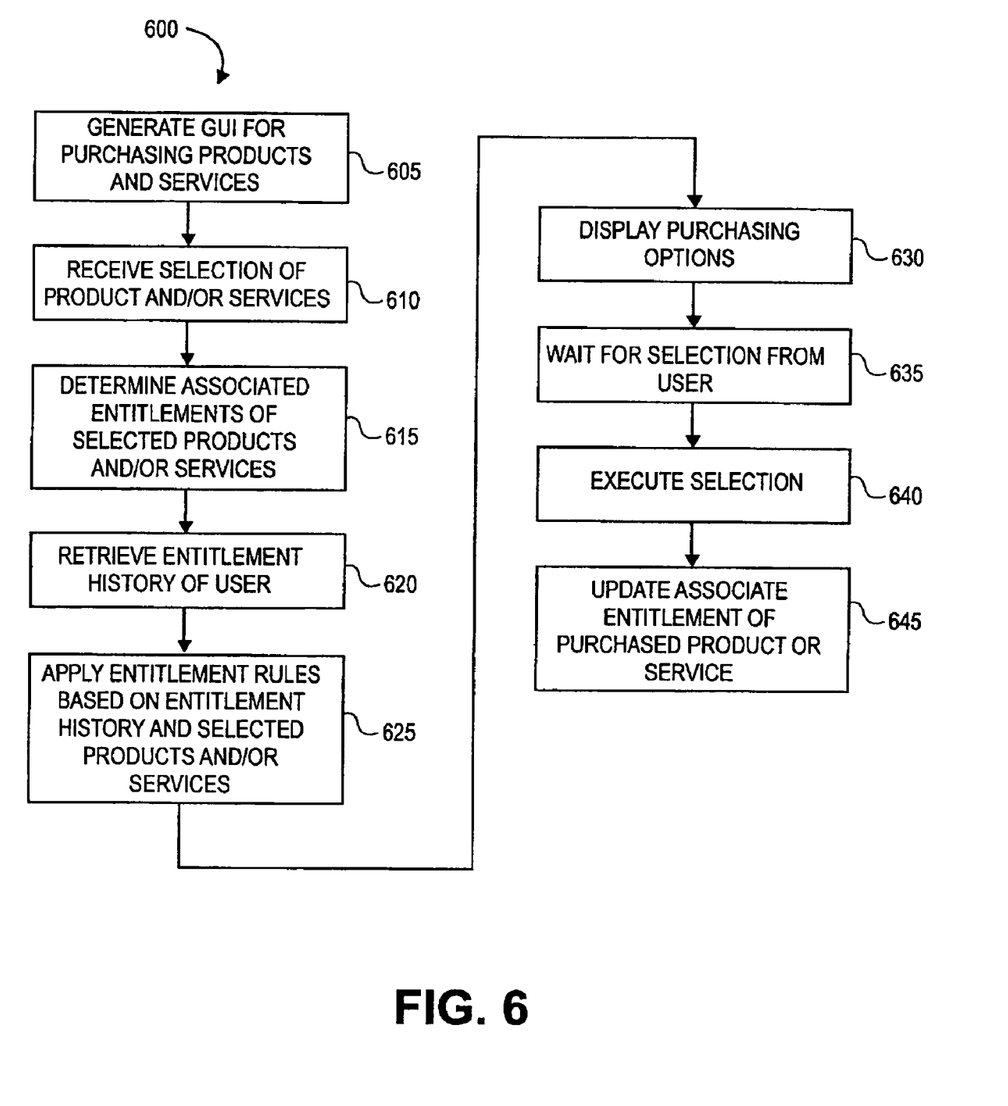
FIG. 6 illustrates an exemplary flow diagram executed by the entitlement manager module in accordance with yet another embodiment.

FIG. 6 illustrates a flow diagram 600 executed by the entitlement manager module 305 in accordance with yet another embodiment. It should be readily apparent to those of ordinary skill in the art that the flow diagram 600 depicted in FIG. 6 represents a generalized schematic illustration and that other steps may be added or existing steps may be removed or modified.

As depicted in FIG. 6, the entitlement manager module 305 can be configured to generate a browsing graphical user interface (GUI) for purchasing products and services, in step 605. More particularly, a purchasing user can log-in into the service portal 115. After the purchasing user is authenticated, a home page for the service portal 115 can be displayed. The purchasing user can select an option to purchase products and/or services provided by the service portal 115 and the user can then be directed to the browsing GUI.

Figure 7:
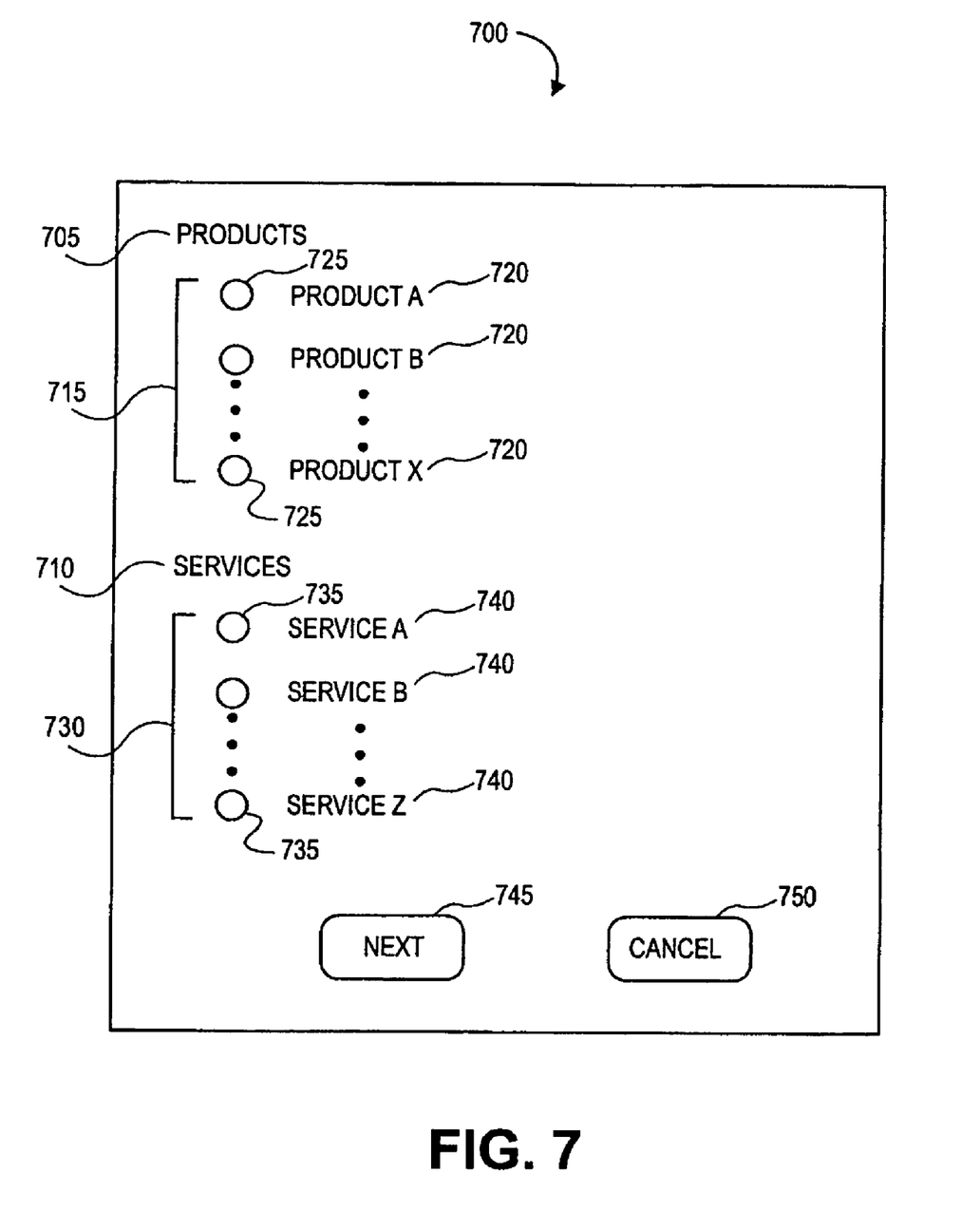
FIG. 7 depicts an exemplary GUI in accordance with yet another embodiment.

An exemplary embodiment of the browsing GUI 700 is depicted in FIG. 7. It should be readily apparent to those of ordinary skill in the art that the browsing GUI 700 depicted in FIG. 7 represents a generalized schematic illustration and that other components may be added or existing components may be removed or modified.

As shown in FIG. 7, the browsing GUI 700 can comprise a product heading 705 and a services heading 710. Under the product heading 705, a product list 715 can be displayed. Each product 720 have a selection button 725. Similarly, a service list 730 can be displayed under the service heading 710 with respective selection buttons 735 associated with a service 740. Accordingly, a user can select a single or multiple products and/or services to purchase. Although not shown, other embodiments of the browsing GUI 700 can include a search dialog box to narrow the selection of products and/or services.

The next button 745 can be configured to take the user selection and package the selected products and/or services to the purchasing system of the service portal 115 and a copy of the selected products and/or services to be stored temporarily by the entitlement manager module 305. The cancel button 750 can be configured to cancel the prospective transaction and return the user to the home page of the service portal 115.

Returning to FIG. 6, the entitlement manager module 305 can be configured to enter a wait state until the user activates the next button 745 on the browsing GUI 700, in step 610. More particularly, the entitlement manager module 305 can store the selected products and/or services in a temporary buffer in response to the activation of the next button 745. Although not shown, if the user activates the cancel button 750 of the displayed browsing GUI 700, the entitlement manager module 305 can stop executing flow diagram 600.

In step 615, the entitlement manager module 305 can be configured to determine associated entitlements of the selected products and/or services. More specifically, the entitlement manager module 305 can send a query through the product database interface 335 to retrieve the associated entitlements. The associated entitlement data for the selected products and/or services are also temporarily buffered by the entitlement manager module 305. The associated entitlement data can comprise length of time for the associated entitlement as well as as cost among other items.

In step 620, the entitlement manager module 305 can be configured to send another query through the entitlement data interface 325 to retrieve a user history of previously purchased entitlements, i.e., a user history state. The user history can include information such as current start dates, current expiration dates, length of time for the retrieved entitlements. The user history can then be buffered by the entitlement manager module 305 in a temporary buffer.

In step 625, the entitlement manager module 305 can be configured to apply the entitlement rules from the rules module 315 to the associated entitlement data for the selected products and/or services and the user history of previously purchased entitlements. More specifically, the entitlement rules can be applied to determine multiple purchasing conditions or scenarios based on the current selected products and/or services and past entitlements. The purchasing conditions are then displayed on a purchasing GUI shown in FIG. 8, in step 630.

Figure 8:
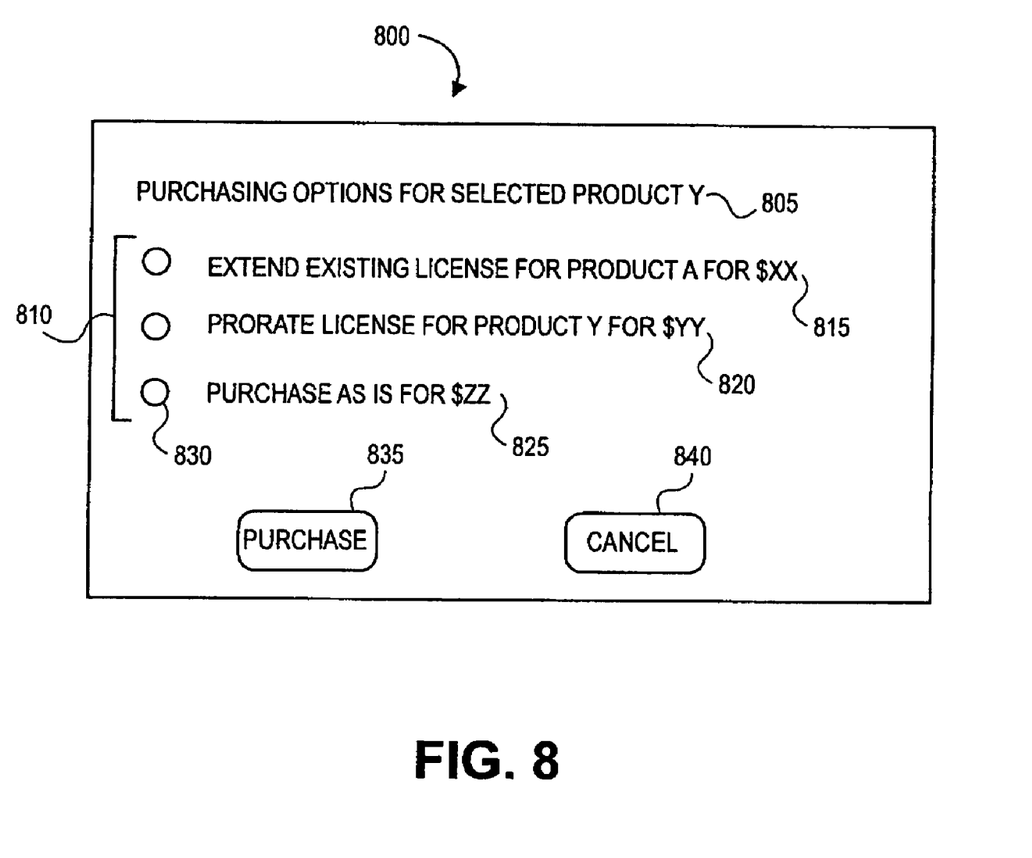
FIG. 8 illustrates another exemplary GUI in accordance with yet another embodiment.

FIG. 8 depicts an exemplary purchasing GUI 800 in accordance with yet another embodiment. It should be readily apparent to those of ordinary skill in the art that the purchasing GUI 800 depicted in FIG. 8 represents a generalized schematic illustration and that other components may be added or existing components may be removed or modified.

As shown in FIG. 8, the purchasing GUI 800 can comprise a header line 805 that depicts purchasing option for the selected products and/or services. GUI 800 can also comprise a purchasing conditions list 810 with purchasing condition 815-825 with respective selection buttons 830. Purchasing condition 815 indicates the cost for extending any previously purchased entitlements to coincide with the termination of the current selected products and/or services for a certain amount. Purchasing condition 820 can indicate the cost for pro-rating the current entitlement of the selected product and/or service to the current expiration of a previously purchased product and/or service. Purchasing condition 825 indicates the cost of purchasing the selected product and/or service as currently selected.

The GUI 800 can further comprise a purchase button 835 and a cancel button 840. A user can select one of the purchasing conditions and activate the purchase button 835 to complete the transaction. A user can also activate the cancel button 840 to cancel the current selection and return to the browsing GUI 700.

Returning to FIG. 6, the entitlement manager module 305 can be configured to enter a wait state for the purchasing user to select either the purchase button 835 or the cancel button 840, in step 635.

In step 640, the entitlement manager module 305 can be configured to receive the purchase indication from the activation of the purchase button 835. More specifically, the entitlement manager module 305 can be configured to pass the information from the selected purchasing condition to the purchasing system of the service portal 115 through the purchasing system interface 330.

In step 645, the entitlement manager module 305 can be configured to update the entitlement data with the purchased product and/or service with the associated entitlement through the entitlement data interface 325.

Figure 9:
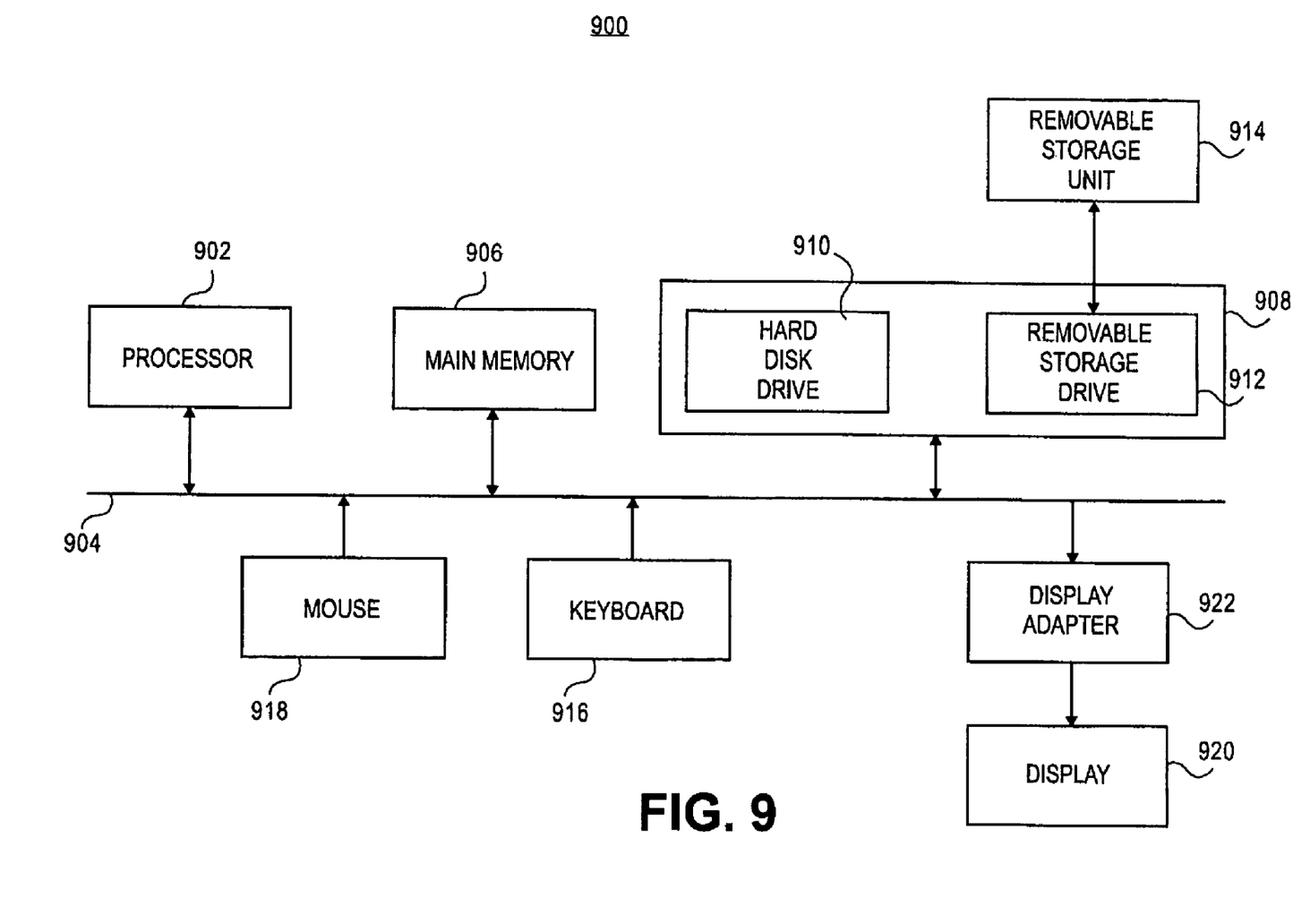
FIG. 9 depicts an exemplary computing platform in accordance with yet another embodiment.

FIG. 9 illustrates an exemplary block diagram of a computing platform 900 where an embodiment may be practiced. The functions of the entitlement manager 120 may be implemented in program code and executed by the computing platform 900. The entitlement manager 120 may be implemented in computer languages such as PASCAL, C, C++, JAVA, etc.

As shown in FIG. 9, the computer system 900 includes one or more processors, such as processor 902 that provide an execution platform for embodiments of the entitlement manager 120. Commands and data from the processor 902 are communicated over a communication bus 904. The computer system 900 also includes a main memory 906, such as a. Random Access Memory (RAM), where the entitlement manager 120 may be executed during runtime, and a secondary memory 908. The secondary memory 908 includes, for example, a hard disk drive 910 and/or a removable storage drive 912; representing a floppy diskette drive, a magnetic tape drive, a compact disk drive, etc., where a copy of a computer program embodiment for the entitlement manager 120 may be stored. The removable storage drive 912 reads from and/or writes to a removable storage unit 914 in a well-known manner. A user interfaces with the entitlement manager 120 with a keyboard 916, a mouse 918, and a display 920. The display adapter 922 interfaces with the communication bus 904 and the display 920. The display adapter 922 also receives display data from the processor 902 and converts the display data into display commands for the display 920.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of managing entitlements, the method comprising:
   receiving an indication of a new purchase by a user, the new purchase having an associated entitlement being distinct from existing entitlements associated with previous purchases of the user;
   determining the existing entitlements associated with the previous purchases of the user;
   determining, by a server, a plurality of purchasing conditions based on the existing entitlements and the new purchase, the plurality of purchasing conditions allowing the user to modify at least one of the existing entitlements relative to the associated entitlement of the new purchase or prorate the associated entitlement of the new purchase based on the existing entitlements;
   providing the plurality of purchasing conditions for the user to select; and
   receiving a selection of one of the plurality of purchasing conditions.

2. The method of claim 1 further comprising determining at least one rule for the determination of the plurality of purchasing conditions.

3. The method of claim 1 further comprising:
   maintaining an entitlement data of past purchases and associated entitlements of the user; and
   determining the existing entitlements of the user based on the entitlement data.

4. The method of claim 3, wherein the entitlement data is stored on a persistent storage device.

5. The method of claim 1, wherein the providing the plurality of purchasing conditions for the user to select further comprises generating a graphical user interface that displays the plurality of purchasing conditions.

6. The method of claim 5, further comprising displaying an option to purchase at least one of the plurality of purchasing conditions.

7. A system for managing entitlements, the system comprising:
   a service portal operable to connect to a network and configured to provide products and services to be purchased by a user; and
   a processor configured to execute an entitlement manager module, the entitlement manager module configured to:
   receive an indication of a new purchase, the new purchase having an associated entitlement being distinct from existing entitlements associated with previous purchases;
   determine the existing entitlements associated with the previous purchases of the user;
   provide, from a server, a plurality of purchasing conditions based on the existing entitlements and the new purchase, the plurality of purchasing conditions allowing the user to modify at least one of the existing entitlements relative to the associated entitlement of the new purchase or prorate the associated entitlement associated with of the new purchase based on the existing entitlements; and
   receive a selection of one of the plurality of purchasing conditions.

8. The system of claim 7, wherein the entitlement manager module further comprises:
   an interface coupled to a persistent storage device configured to store entitlement data; and
   a second interface coupled to a second persistent storage device configured to store profiles of users.

9. The system of claim 8, wherein the entitlement manager module further comprises a rules module configured to store and execute at least one rule to determine a purchasing condition for the user.

10. The system of claim 8, wherein the entitlement manager module is configured to retrieve a user profile in response to the user logging into the service portal.

11. The system of claim 8, further comprising a user interface module configured to generate a first user interface for the user to view the products and services available for purchase.

12. The system of claim 11, wherein the entitlement manager is configured to receive the indication of the new purchase from the first user interface.

13. The system of claim 12, wherein the entitlement manager is configured to invoke the user interface module to generate a second user interface that displays the plurality of purchasing conditions.

14. The system of claim 13, wherein the entitlement manager is configured to update the entitlement data with a selected purchasing condition to the entitlement data in response to receiving the selection.

15. An apparatus configured to manage entitlements, the apparatus comprising:
a processor configured to execute:
an entitlement manager connected to a network and configured to manage entitlements associated with products and services;
a user interface module configured to generate user interfaces and coupled with the entitlement manager;
a first interface connected to coupled to the entitlement manager, wherein the first interface is configured to interface with entitlement data; and
a second interface configured to couple with the entitlement manager, wherein the second interface is configured to interface with a plurality of user profiles, and the entitlement manager is configured to:
receive an indication of at least one new purchase by a user from the plurality of user profiles, the at least one new purchase having an associated entitlement being distinct from existing entitlements associated with previous purchases;
determine the existing entitlements associated with the previous purchases of the user;
provide, from a server, a plurality of purchasing conditions based on the existing entitlements and the at least one new purchase, wherein the plurality of purchasing conditions is configured to allow the user to modify at least one of the existing entitlements relative to the associated entitlement of the at least one new purchase or prorate the associated entitlement of the at least one new purchase based on the existing entitlements; and
receive a selection of one of the plurality of purchasing conditions.

16. The apparatus of claim 15, further comprising a rules module configured to store and execute at least one rule to determine a purchasing condition for the user.

17. The apparatus of claim 16, wherein the entitlement manager is configured to retrieve a user profile of the user in response to the user authenticating itself.

18. The apparatus of claim 15, wherein the user interface module is configured to generate a first user interface for the user to view the products and services available for purchase.

19. The apparatus of claim 15, wherein the entitlement manager is configured to receive the indication of the new purchase from the first user interface.

20. The apparatus of claim 19, wherein the entitlement manager is configured to invoke the user interface module to generate a second user interface that displays the plurality of purchasing conditions.

21. The apparatus of claim 20, wherein the entitlement manager is configured to update the entitlement data with a selected purchasing condition to the entitlement data in response to receiving the selection.

* * * * *